(12) United States Patent
Herman

(10) Patent No.: US 11,056,863 B2
(45) Date of Patent: Jul. 6, 2021

(54) MULTIPLE ACTION HOIST

(71) Applicant: Andrew Herman, Olney, IL (US)

(72) Inventor: Andrew Herman, Olney, IL (US)

( * ) Notice: Subject to any disclaimer, the term of this patent is extended or adjusted under 35 U.S.C. 154(b) by 421 days.

(21) Appl. No.: 16/098,974

(22) PCT Filed: May 10, 2017

(86) PCT No.: PCT/US2017/031851
§ 371 (c)(1),
(2) Date: Nov. 5, 2018

(87) PCT Pub. No.: WO2017/196911
PCT Pub. Date: Nov. 16, 2017

(65) Prior Publication Data
US 2019/0157850 A1    May 23, 2019

Related U.S. Application Data

(60) Provisional application No. 62/333,902, filed on May 10, 2016.

(51) Int. Cl.
| | |
|---|---|
| *H02G 1/04* | (2006.01) |
| *H02G 1/02* | (2006.01) |
| *B66D 3/16* | (2006.01) |
| *B66D 5/34* | (2006.01) |

(Continued)

(52) U.S. Cl.
CPC ............... *H02G 1/04* (2013.01); *B66D 3/043* (2013.01); *B66D 3/14* (2013.01); *B66D 3/16* (2013.01); *B66D 5/34* (2013.01); *H02G 1/02* (2013.01); *B66D 2700/05* (2013.01)

(58) Field of Classification Search
CPC . B66D 3/02; B66D 3/043; B66D 3/14; B66D 3/32; B66D 3/34; B66D 2700/05; H02G 1/02; H02G 1/04
See application file for complete search history.

(56) References Cited

U.S. PATENT DOCUMENTS 2,501,253 A * 3/1950 Anglemyer ............. B66D 3/14
254/369
2,535,318 A * 12/1950 Telford .................. B65H 75/38
254/306

(Continued)

*Primary Examiner* — Sang K Kim
*Assistant Examiner* — Nathaniel L Adams
(74) *Attorney, Agent, or Firm* — Leydig, Voit & Mayer, Ltd.

(57) ABSTRACT

A hoist for transferring the ends of power lines between supports at different locations including a pair of hoist mechanisms each having a respective tension line receiving drum and which are simultaneously operable with a single crank arm. Each drum has a respective ratchet mechanism that can be selectively set such that upon pivotable movement of the single crank arm between a first and second positions the ratchet mechanisms (i) simultaneously rotate both the drums in a take up direction for simultaneously winding said tensions lines onto the drums, (ii) simultaneously enable rotation of the drums in a release direction for simultaneously unwinding the tensions lines from the drums, or (iii) rotate one drum in a take-up direction for winding the respective tension line on the one drum while simultaneously enabling rotating the other drum in a release direction for unwinding the tension line from the other drum.

20 Claims, 10 Drawing Sheets

(51) Int. Cl.
*B66D 3/14* (2006.01)
*B66D 3/04* (2006.01)

(56) References Cited

U.S. PATENT DOCUMENTS

| | | | | | |
|---|---|---|---|---|---|
| 2,635,724 | A | * | 4/1953 | Fox | B66D 1/06 |
| | | | | | 192/16 |
| 3,263,965 | A | * | 8/1966 | Mutch | B66D 3/043 |
| | | | | | 254/281 |
| 3,672,637 | A | * | 6/1972 | Profet | B66D 3/14 |
| | | | | | 254/376 |
| 8,991,790 | B2 | * | 3/2015 | Herman | H02G 1/02 |
| | | | | | 254/134.3 R |

* cited by examiner

MULTIPLE ACTION HOIST

CROSS-REFERENCE TO RELATED APPLICATIONS

This patent application claims the benefit of U.S. Provisional Patent Application No. 62/333,902, filed on May 10, 2016, which is incorporated by reference.

FIELD OF THE INVENTION

The present invention relates generally to hoists which have particular utility in the transfer of ends of power lines between support posts, and more particularly, to an apparatus and method for transferring the ends of power lines from one support post to a different nearby support post or location of support.

BACKGROUND OF THE INVENTION

Power lines are supported in the field by support posts, or cross arms of such support posts, at elevations of 60 feet or more above the ground. It often is necessary to transfer the ends of such power lines from one support post to another due to damage, aging, or rotting of the post material. This commonly is done by hand operated hoists operated by linemen positioned at the elevation of the power line.

Typically, two separate hoists have been required by workmen for transferring power lines from location to another. Since the power lines usually are maintained in high tension, the handling of separate hoists by workmen high on the support post can be highly cumbersome, difficult, and dangerous. Applicant's prior U.S. Pat. No. 8,991,790, the disclosure of which is incorporated herein by reference, discloses a unitary hoist and simplified method of transferring power lines between support locations. The unitary hoist includes a pair of ratchet controlled tension line receiving drums. Each drum has a respective ratchet mechanism and crank arm for rotating the respective take-up drum in a tension line take-up or release direction. To simultaneously release or take-up the tension lines from the pair of drums, however, it is necessary for the workmen to operate the crank arms at the same time, which can be cumbersome, particularly if one drum is being operated to take-up the tension line and the other drum is being operated to release the tension line.

OBJECTS AND SUMMARY OF THE INVENTION

It is an object of the present invention to provide a unitary hoist having a multiplicity of tension lines for moving the ends of power lines between different support locations that is easier and safer for a workman to operate.

Another object is to provide a unitary hoist as characterized above which can be selectively operated by a single hand operated crank arm of the hoist for simultaneously drawing a multiplicity of transfer lines onto the respective drums, for simultaneously releasing the multiplicity of transfer lines from the drums, or for drawing in the transfer line on one drum while simultaneously releasing the transfer line from another drum.

Another object is to provide a hoist mechanism of the foregoing type that is relatively simple and economical in construction.

Other objects and advantages of the invention will become apparent upon reading the following detailed description and upon reference to the drawings, in which:

Figure 1:
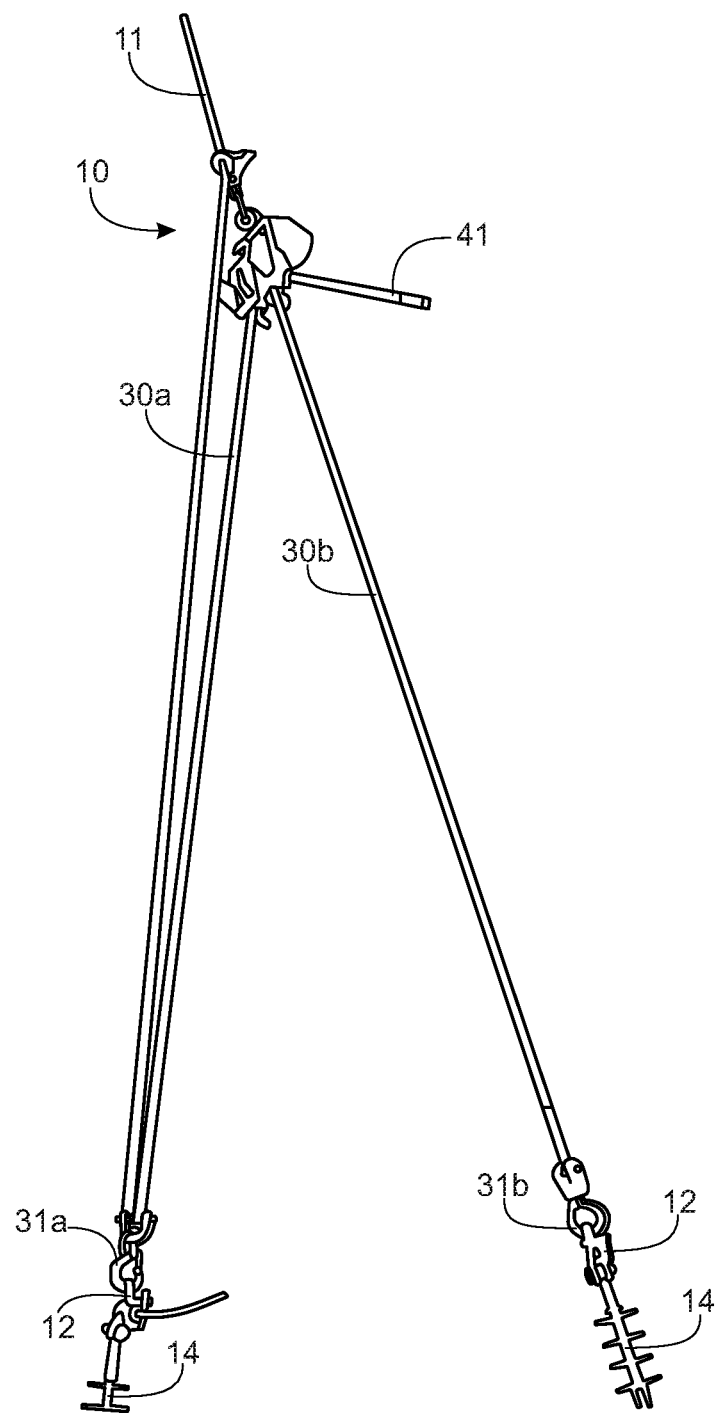
FIG. 1 is a perspective of an illustrated multiple action hoist in accordance with the present invention usable in the transfer of the end of a power line from one support location to a new support location.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DETAILED DESCRIPTION OF THE PREFERRED EMBODIMENTS

Referring now more particularly to the drawings, there is shown an illustrative hoist 10 in accordance with the invention, which is effective for efficiently transferring the end of a power line 11 from one support post to a second newly-installed post in relatively closely displaced relation to the original post, or from one support position on a support post to a different support position on the post either vertically or horizontally offset from the original position. As in known in the art, the end of the power line 11 commonly is connected to a support post, or a cross arm of the support post by a dead end connector 12 of a conventional type within which the terminal end of the power line 11 is clamped. The dead end connector 12 in turn is coupled to an insulator 14, again of a known type, which is coupled to the support post or cross arm thereof in a conventional manner, such as by a sister eye bolted to the cross arm. Applicants referenced prior U.S. Pat. No. 8,991,790 discloses a unitary hoist for effecting such transfer of a power line having a pair of tension line take-up and releasing drums operated by a pair of crank arms. As described in that patent, the tension line of one take-up drum is connected to the end of a power line to be transferred, and the tension line of the other drum can be connected to the support to which the end of the power line is to be transferred.

In accordance with the present invention, the hoist 10 has a unitary multi-action construction operable by means of a single actuating element for more efficient, safer, and easier operation. The illustrated hoist 10 has a pair of independently operable hoist mechanisms 20a, 20b carried by a frame 21 comprising a pair of hollow elongated hoist supports 22a, 22b fixedly secured together by opposite upper and lower end plates 24, 25 respectively. The hoist mechanism 20a, 20b each have a respective tension line receiving drum 26a, 26b supported on a respective transverse shaft 29a, 29b rotatably carried by the frame supports 22a, 22b. Respective tensioning lines 30a, 30b, which may be a strap, chain, cable, rope, or the like, each have a hook 31a, 31b at its outer end and is secured to the respective drum 26a, 26b for winding and unwinding about the drum. An outwardly extending hook 32 in this case is bolted to the end plate 24, and as will be understood by a person skilled in the art, eyelets or the like could be secured in outwardly extending fashion from the lower end plate 25. The shafts 29a, 29b which are rotatably supported coaxially by the hoist supports 22a, 22b in this instance each having a respective hand adjusting wheel 34a, 34b fixed at an outer accessible end.

In carrying out the invention, the hoist mechanisms 20a, 20b each have a respective ratchet mechanism actuated by a single pivotable crank arm 41 for easier operation. The ratchet mechanisms each include a respective ratchet wheel 42a, 42b fixed to a side of the respective drum 26a, 26b and associated pawl mechanisms that are selectively adjustable such that upon pivotable movement of the single crank arm the ratchet mechanisms (i) simultaneously rotate both drums 26a, 26b in a take-up direction for simultaneously winding the tension lines 30a, 30b onto the drums, (ii) simultaneously rotate the drums 26a, 26b in a release direction for simultaneously unwinding the tension lines 30a, 30b from the drums 26a, 26b or (iii) rotate one drum in a take-up direction for winding the respective tension line on the one drum while rotating the other drum in a release direction for simultaneously unwinding the tension line from the other drum.

The crank arm 41 in this case is centrally supported in outwardly extending relation from a crank arm frame 44 mounted for pivotable movement relative to the transverse shafts 29a, 29b of the tension line receiving drums 26a, 26b. The crank arm frame 44 in this case comprises two u-shaped frame members 45a, 45b having ends pivotably mounted on the respective transverse shafts 29a, 29b of the tension receiving drums 26a, 26b and are interconnected at an outer end by an intermediate hub 46. The illustrated hub 46 is tubular in shape for removably receiving the end of the crank arm 41 which can be removably secured within the hub 46 by a transverse retaining pin or lug.

Pawl mechanisms for the ratchet wheels 42a, 42b include first and second pawls 50a, 50b and 51a, 51b. The first pawls 50a, 50b are pivotably mounted on a respective transverse shafts 54a, 54b carried by the frame supports 22a, 22b and each have an end biased into engagement with teeth of a respective ratchet wheels 42a, 42b by a biasing spring and camming plate 55a, 55b. The ratchet wheels 42a, 42b and first pawls 50a, 50b may be of a conventional type, such as utilized in the series 300A Lineman's hoist sold under the tradename Little Mule® by Columbus McKinnon Corporation.

Figure 7:
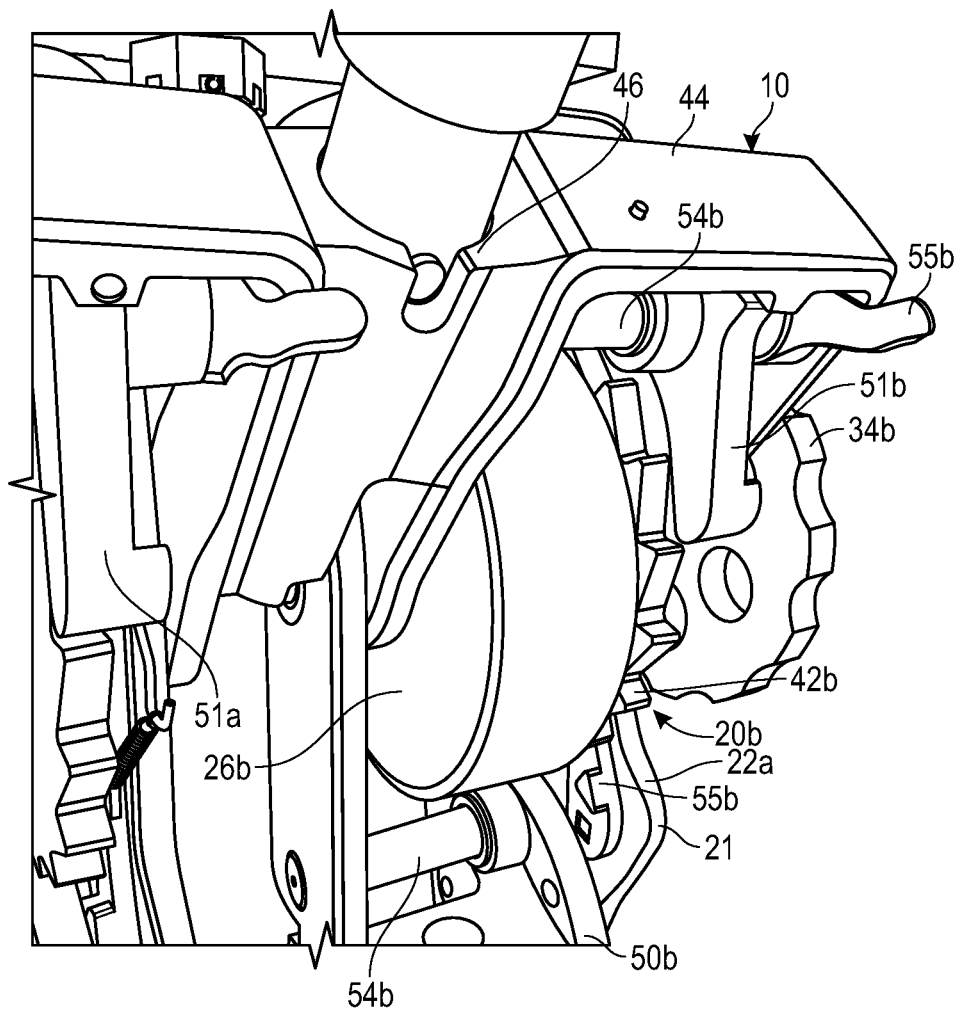
FIG. 7 is a rear perspective, similar to FIG. 5, but showing pawls of the ratchet mechanisms in a tension line release position with the crank arm in a raised position.
Figure 8:
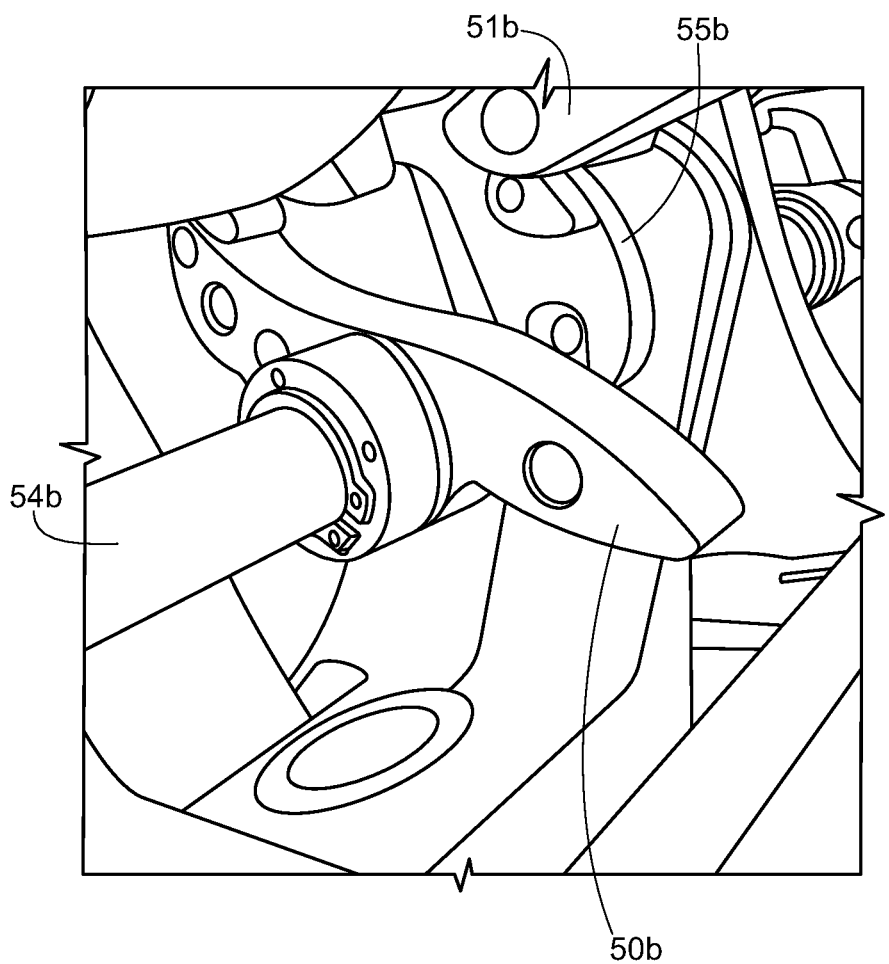
FIG. 8 is an enlarged perspective, similar to FIG. 7, showing the pawls of the illustrated hoist in engaging relation to each other while in a release position when the crank arm is in a lowered position.
Figure 9:
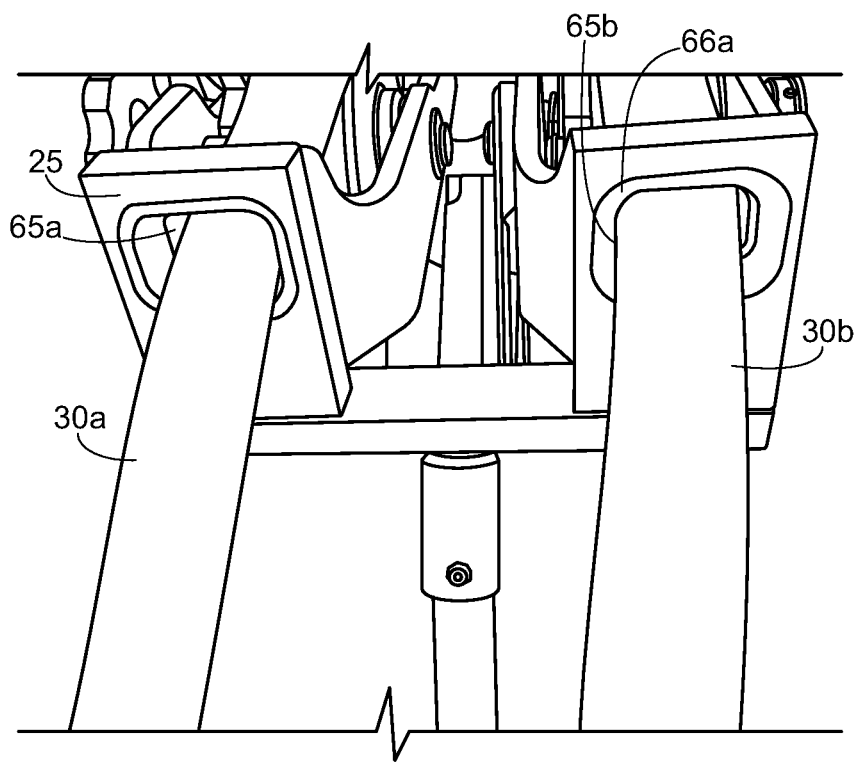
FIG. 9 is a bottom perspective of the illustrated hoist.

In keeping with the invention, the second pawls 51a, 51b are mounted on the frame 44 of the single crank arm 41 for interaction with respective ratchet wheels 42a, 42b as an incident to movement of the single crank arm 41. The second pawls 51a, 51b are mounted on respective transverse shafts 54a, 54b supported by the handle frame members 45a, 45b and are controlled by respective spring biased actuating levers 55a, 55b for selective positioning between a first position for biasing the second pawls 51a, 51b into engaging relation with the ratchet wheels 42a, 42b (FIG. 5) and a second position that biases the second pawls 51a, 51b outwardly of the ratchet wheels 42a, 42b (FIG. 7). The basic design of the second pawls 51a, 51b and their actuating levers again may be of a conventional type used in the aforereferenced series 300A Lineman's hoist.

Figure 5:
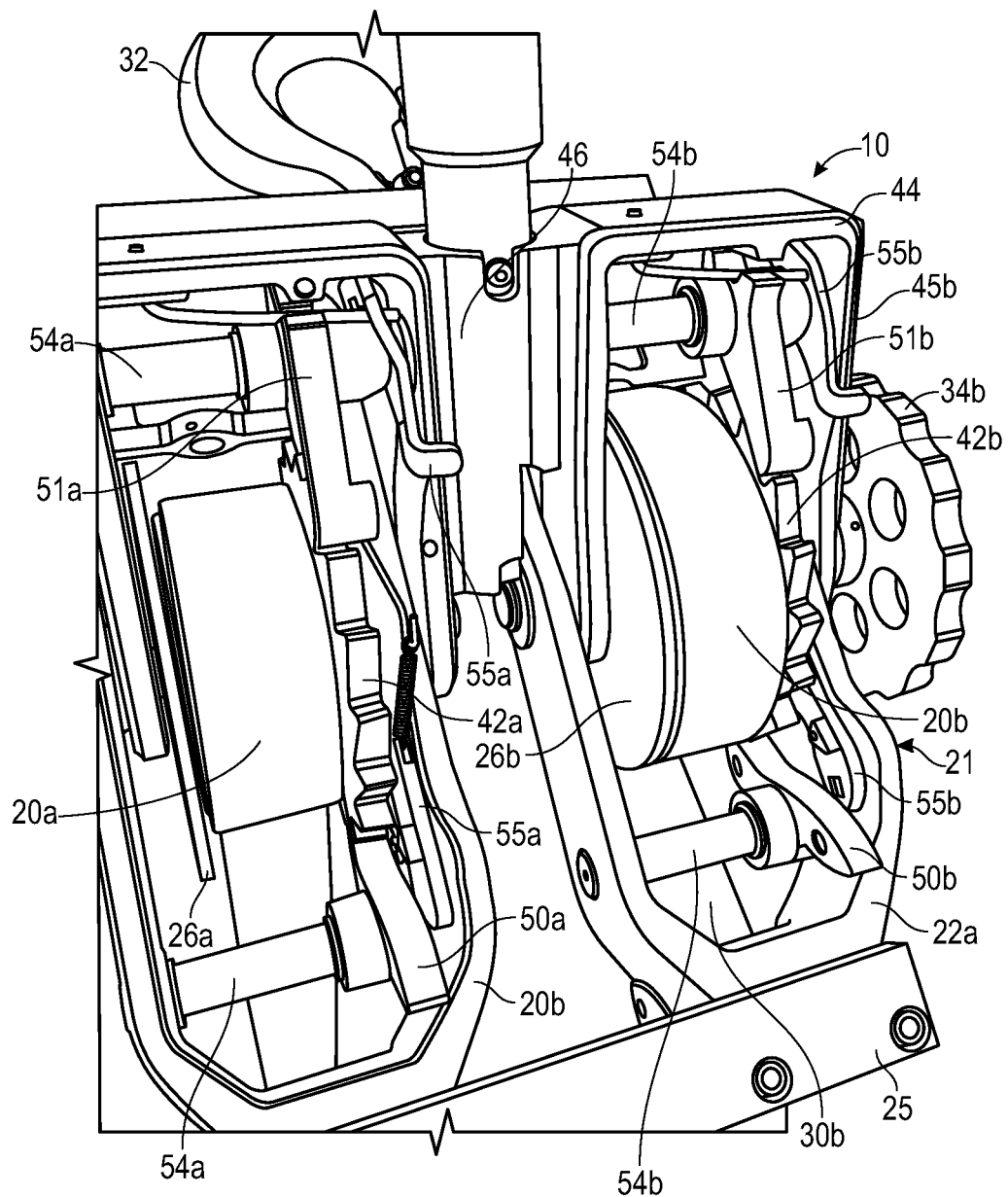
FIG. 5 is an enlarged rear perspective, similar to FIG. 3, showing pawls of the ratchet mechanisms of the hoist in tension line take-up positions.
Figure 6:
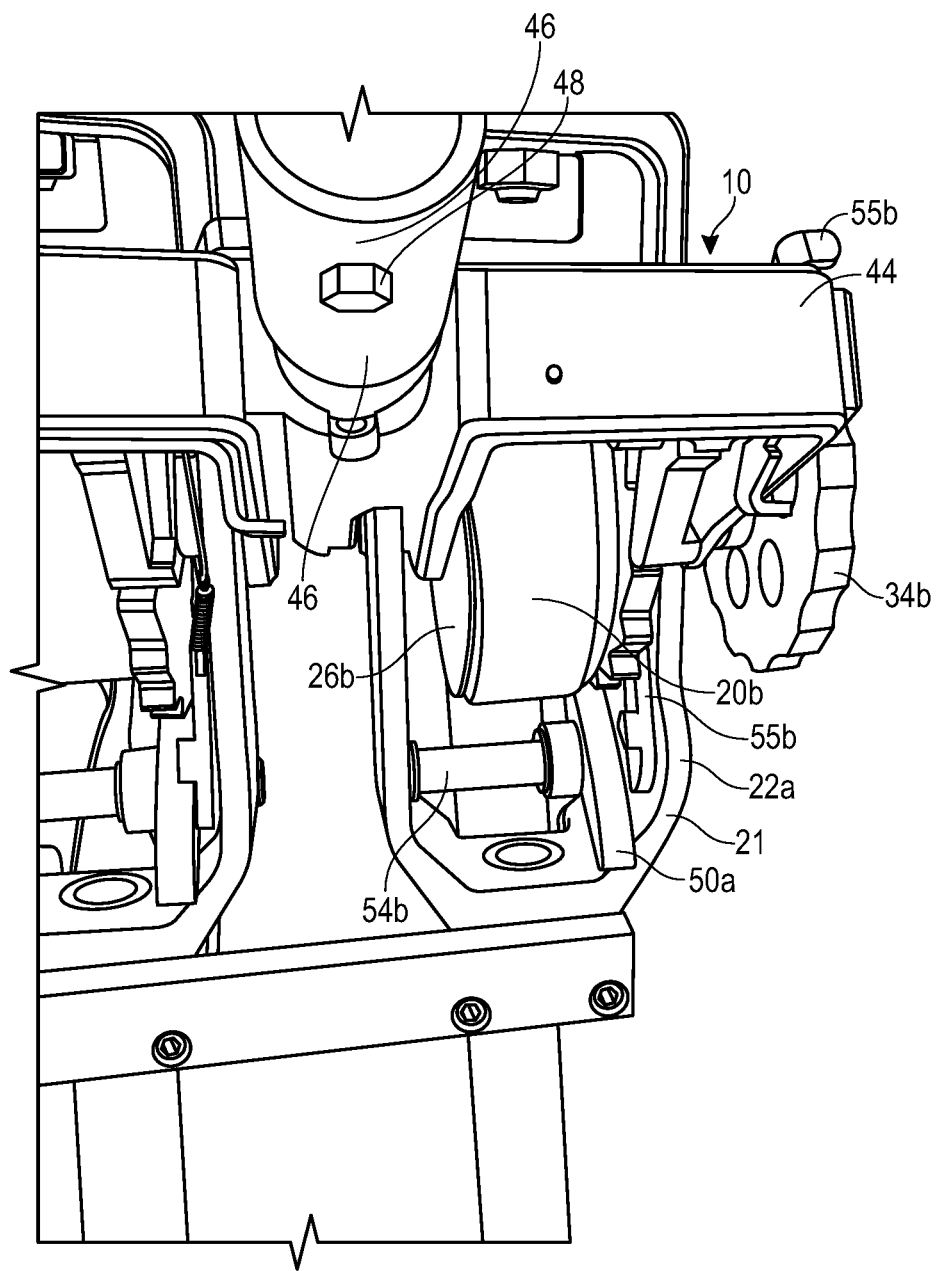
FIG. 6 is an enlarged perspective, similar to FIG. 5, showing the single crank arm of the hoist being lowered with the pawls in a tension line take-up position.

It will be seen that when the actuating levers 55a, 55b for the second pawls 51a, 51b are rotated in a counterclockwise direction to a tensioning line take-up position, as viewed in FIG. 5, the second pawls 51a, 51b are spring biased into engaging relation with the teeth of the ratchet wheels 42a, 42b. Downward movement of the single crank arm 41, as depicted in FIG. 6, causes the pawls 51a, 51b to rotate the ratchet wheels 30a, 30b, and hence drums 26a, 26b, in a rotary direction for winding the tensioning lines onto the drums 26a, 26b in a take-up direction. In the illustrated embodiment, pivotal movement of the crank arm 41 to its lower most position causes the ratchet wheels 42a, 42b and drums 26a, 26b to rotate a circumferential distance corresponding to three teeth of the ratchet wheels. At that lowered crank arm position, the first pawls 50a, 50b are then biased into engaging relation with the teeth, such that return movement of the crank arm to a raised position maintains the ratchet wheels 42a, 42b and drums 26a, 26b against return movement. Repeated actuation of the single crank arm 41 with the actuating levers 55a, 55b for the second pawls 51a, 51b in their take-up position, simultaneously draws the tensioning lines 30a, 30b in a windup direction.

Figure 2:
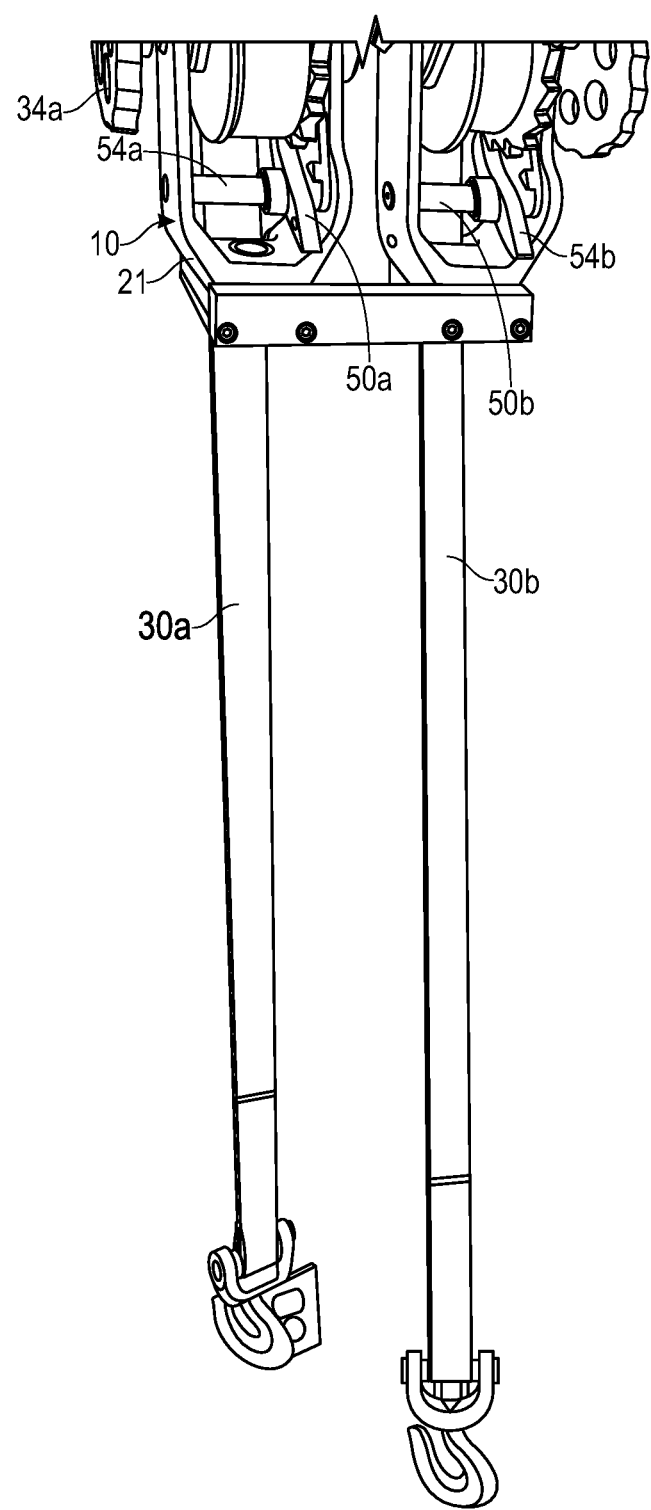
FIG. 2 is an enlarged perspective of the hoist shown in FIG. 1 depicted in a vertically suspended position.
Figure 3:
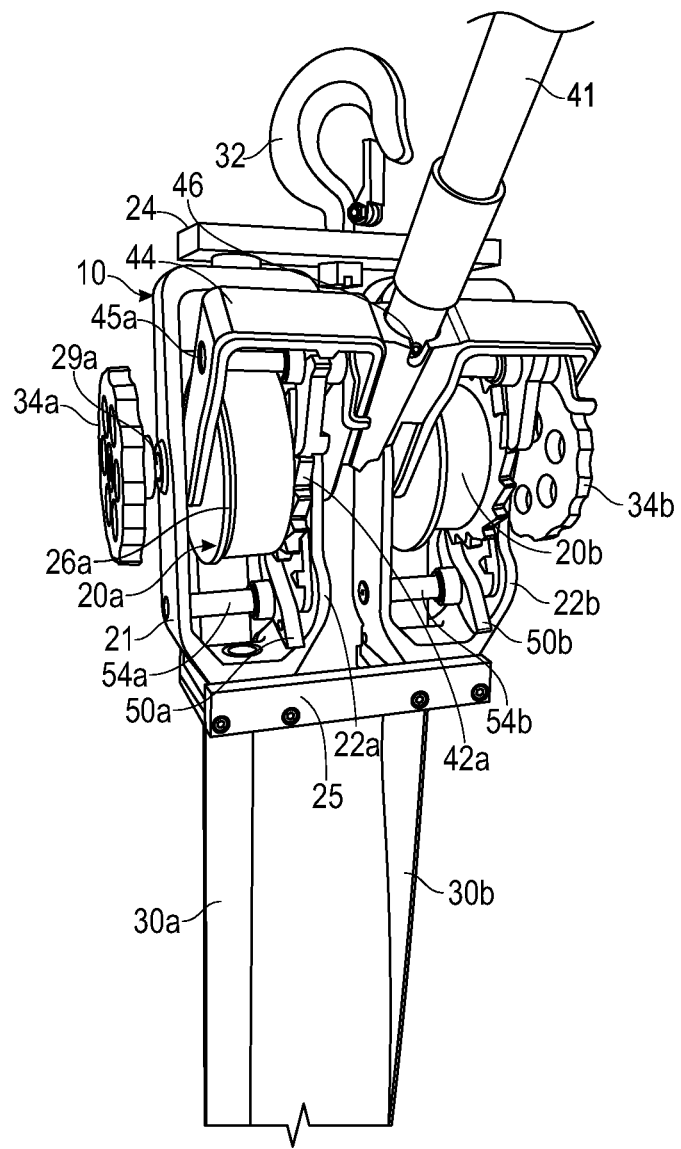
FIG. 3 is an enlarged rear perspective of the illustrated hoist.
Figure 4:
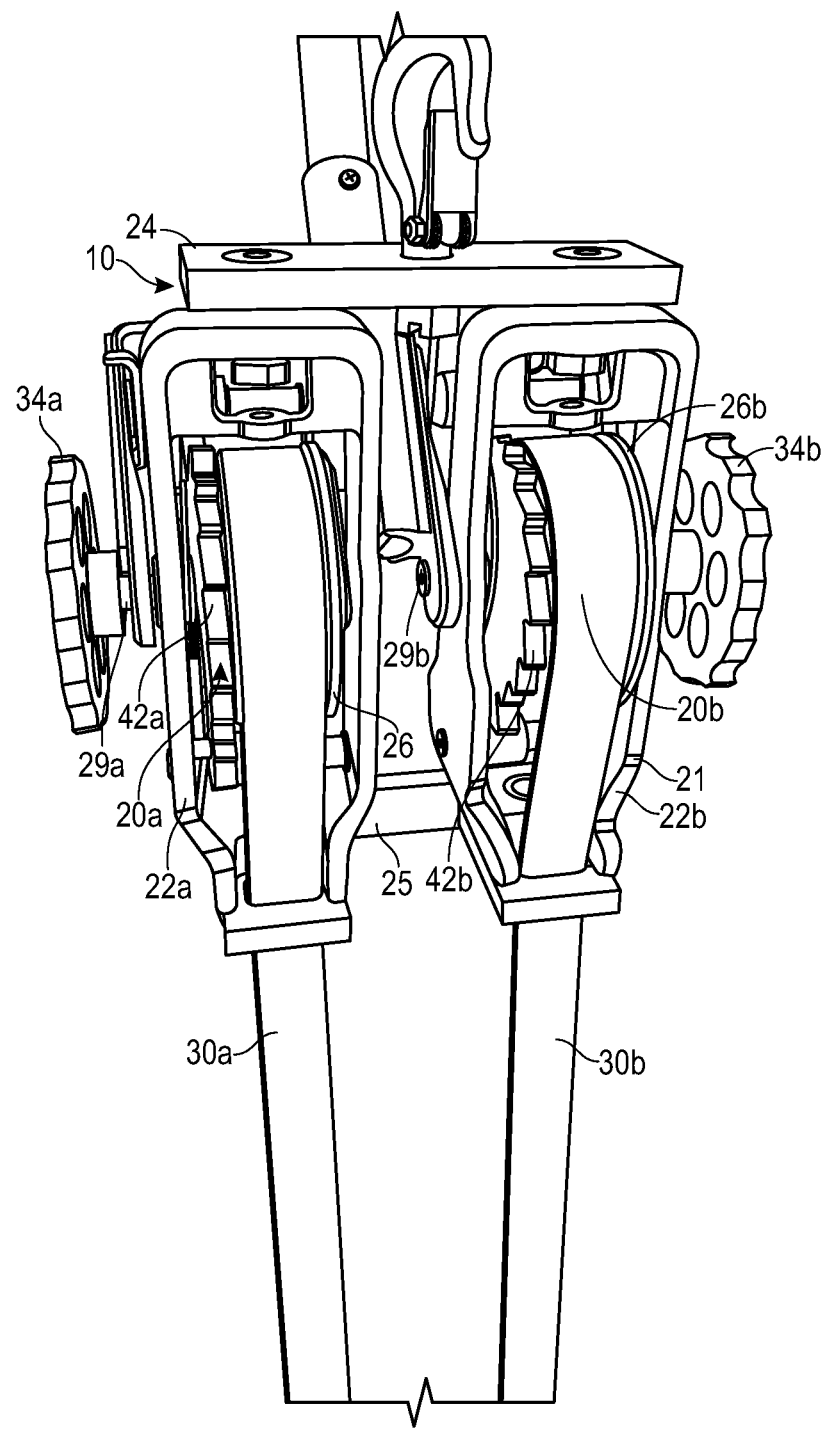
FIG. 4 is an enlarged front perspective of the illustrated hoist.

Rotating the actuating levers 55a, 55b for second pawls 51a, 51b in a clockwise direction to a release position biases the ends of the second pawls 51a, 51b to a position outside the perimeters of the ratchet wheels 42a, 42b (FIG. 2) when the crank arm 41 is in a raised position. Lowering the crank arm handle 41 in this case with the second pawls 51a, 51b free of engagement with the ratchet wheels will cause the second pawls 51a, 51b to engage the camming plates 55a, 55b associated with the first pawls 50a, 50b simultaneously rotate the first pawls 50a, 50b free of engagement with the ratchet wheels 42a, 42b and bias the second pawls 51a, 51b into engagement with the ratchet wheels 42a, 42b to rotate the ratchet wheels 42a, 42b in a release direction corresponding to a single ratchet tooth, at which time the first pawls 50a, 50b are biased into engaging relation with the ratchet retaining the ratchet wheels 42a, 42b and drums 26a, 26b in that position during return movement of the crank arm 41 to a raised position. Each stroke of the crank arm 41 thereby causes rotation of the ratchet wheels 42a, 42b and drums 26a, 26b in a tension line release direction corresponding to a single ratchet tooth. It will be understood actuating levers 55a, 55b for the first pawls 50a, 50b can be individually rotated between take-up or release positions such that during pivotable actuation of the single crank arm 41 one ratchet wheel can be rotated in a take-up direction while the other drum is rotated in a release direction.

It further will be understood by one skilled in the art that the hoist 10 may be used similarly to the hoist disclosed in applicant's above referenced U.S. Pat. No. 8,991,790, but the ability to simultaneously operate the hoist mechanisms in either direction by a single crank arm enables easier, more efficient, and safer operation. Yet, the hoist remains relatively simple and economical in construction.

Figure 10:
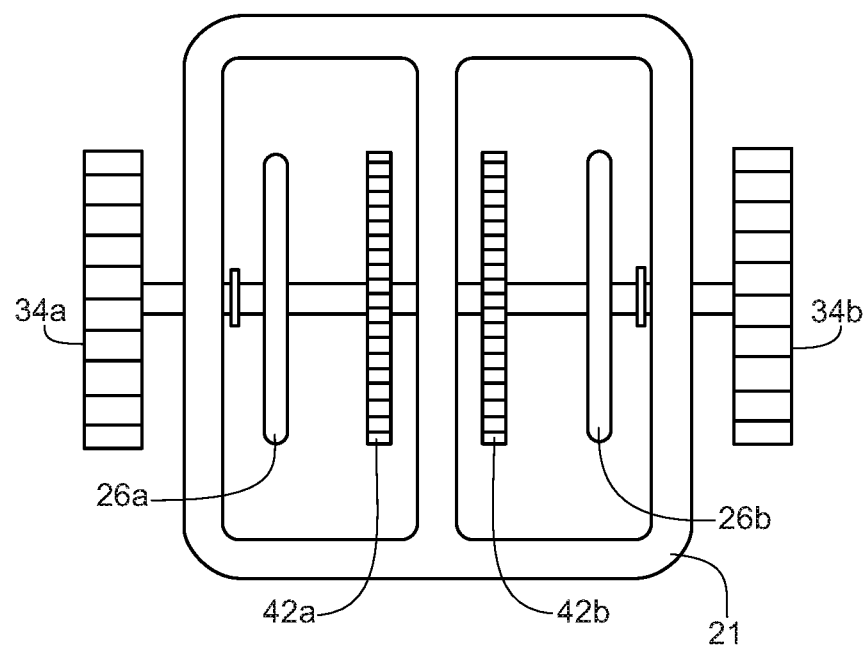
FIG. 10 is a diagrammatic depiction of an alternative embodiment of the hoist in accordance with the invention.

The bottom end plate 25 of the frame 21 in this case is formed with apertures 65a, 65b through which the tensioning lines 30a, 30b are trained. The apertures 65a, 65b have beveled sides 66a, 66b to facilitate take-up and release of the tensioning lines 30a, 30b even when skewed from an off center relation to the hoist. While the ratchet wheels 42a, 42b of the illustrated hoist are located on common right hand sides of the respective hoist mechanisms 20a, 20b (FIG. 5) alternatively as viewed as in FIG. 10, the ratchet wheels 42a, 42b may be mounted on inner sides of the drums 26a, 26b. Such arrangement is advantageous in that while the tensioning lines 30a, 30b typically are drawn straight out from the hoist, or at outwardly skewed angles with respect to the center line of the hoist, with the ratchet wheels 42a, 42b located adjacent inner sides of the drums, as depicted in FIG. 10, there is less likelihood that the tensioning lines could be drawn into interfering engagement with the ratchet wheels 42a, 42b.

The invention claimed is:

1. A hoist apparatus for transferring the ends of power lines between first and second supports at different locations comprising:
   a hoist frame;
   a pair of independently operable hoist mechanisms supported by the hoist frame;
   said hoist mechanisms each including a respective tension line receiving drum rotatably supported by the hoist frame and a tension line having an attachment element at one end and being coupled at its opposite end to the drum for winding and unwinding about the drum, said drum of each hoist mechanism each having a respective ratchet mechanism for enabling selective ratcheted rotational movement of the drum for winding and unwinding the tension line from the drum;
   said ratchet mechanism for each drum including a respective pair of pawl mechanisms;
   a single pivotable crank arm pivotably mounted on the hoist frame for simultaneously actuating said ratchet mechanisms; and
   one pawl mechanism of each pair being selectively adjustable such that upon pivotable movement of said crank arm between a first crank arm position and a second crank arm position said ratchet mechanisms (i) simultaneously rotate the respective drums of both hoist mechanisms in a take up direction for simultaneously winding said tensions lines on said drums, (ii) simultaneously enabling rotation of the respective drums of both hoist mechanisms in a release direction for simultaneously unwinding said tensions lines from said drums, or (iii) rotate the drum of one hoist mechanism in a take-up direction for winding the respective tension line on the drum of that hoist mechanism while enabling rotation of the drum of the other hoist mechanism in a release direction for simultaneously unwinding tension line from the drum of that hoist mechanism.

2. The hoist apparatus of claim 1 in which said single crank arm is mounted on a crank arm frame and supported for pivotable movement about an axis common to said drums.

3. The hoist apparatus of claim 2 in which said one pawl mechanism of each pair including a selectively positionable pawl moveable between a first pawl position in which the respective ratchet mechanism rotates the respective drum in the take up direction upon pivotal movement of the single crank arm from said first crank arm position to said second crank arm position and a second pawl position in which the respective ratchet mechanism enables rotation of the respective drum in the release direction upon pivotable movement of said single crank arm from said first crank arm position to said second crank arm position.

4. The hoist apparatus of claim 3 in which the drums of said hoist mechanisms are rotatably supported by said hoist frame in side-by-side relation to each other, and said ratchet wheels are fixed on inboard sides of the drums in adjacent relation to each other.

5. The hoist apparatus of claim 3 in which said one pawl mechanism of each pair includes a respective actuating lever for positioning the selectively positionable pawl of the pawl mechanism between first and second pawl positions.

6. The hoist apparatus of claim 3 in which said ratchet mechanisms each include a respective ratchet wheel secured to a respective one of the drums for rotation with the respective drum, and said one pawl mechanism of each pair including a manually actuatable lever for selectively positioning the one pawl thereof between said first and second pawl positions.

7. The hoist apparatus of claim 2 in which said one of the pawl mechanism of each pair includes a selectively positionable pawl mounted for pivotable movement on said crank arm frame and the other pawl mechanism of each pair includes a pawl mounted on the hoist frame for relative pivotal movement.

8. The hoist apparatus of claim 1 in which said crank arm is supported by a crank arm frame mounted on said hoist frame for pivotable movement about an axis common to said drums, said one pawl mechanism of each pair being mounted on said crank arm frame, and the other pawl mechanism of each pair being mounted on the hoist frame.

9. The hoist apparatus of claim 1 in which said hoist frame includes a pair of drum supports, and said drum supports each having a respective shaft upon which one of the tension line receiving drums is supported.

10. The hoist apparatus of claim 9 in which said drum supports are each u-shaped and support the respective drum supporting shaft between legs of the support.

11. The hoist apparatus of claim 10 in which said crank arm is mounted on a crank arm frame supported for pivotal movement by the drum support shafts.

12. The hoist apparatus of claim 1 in which said hoist frame has a bottom plate below said drums formed with apertures through which the respective tension lines of the drums of the hoist mechanisms are trained and guided.

13. A hoist apparatus for transferring the ends of power lines between first and second supports at different locations comprising:
   a hoist frame;
   a pair of independently operable hoist mechanisms supported by the hoist frame;
   said hoist mechanisms each including a respective tension line receiving drum rotatably supported by the hoist frame and a tension line having an attachment element at one end and being coupled at its opposite end to the drum for winding and unwinding about the drum, said drum of each hoist mechanism having a respective ratchet mechanism for enabling selective ratcheted rotational movement of the drum for winding and unwinding the tension line from the drum;
   said ratchet mechanisms for each drum including a ratchet wheel affixed to the drum and a respective pair of pawl mechanisms;
   a single pivotable crank arm pivotably mounted on the hoist frame for actuating said ratchet mechanisms; and one pawl mechanism of each pair including a selectively positionable pawl moveable between a first pawl position in which the respective ratchet mechanism rotates the respective drum in a take-up direction for winding the tension line on the respective drum upon pivotal movement of the single crank arm between a first crank arm position and second crank arm position and a second pawl position in which the ratchet mechanism enables rotation of the respective drum in a release direction for unwinding the tension line from the respective drum upon pivotable movement of the single crank arm from said first crank arm position to said second arm position, and said one selectively positionable pawl of each one pawl mechanism being positionable between said first and second pawl positions independently of the other.

14. The hoist apparatus of claim 13 in which said single crank arm is mounted on a crank arm frame and supported for pivotable movement about an axis common to said drums, said selectively positionable pawl of said one pawl mechanism of each pair being pivotably mounted on said crank arm frame and the other pawl mechanism of each pair being mounted on said hoist frame.

15. The hoist apparatus of claim 14 in which said one pawl mechanism of each pair includes a respective actuating lever for positioning the selectively positionable pawl of the pawl mechanism between said first and second pawl positions.

16. The hoist apparatus of claim 13 in which said hoist frame includes a pair of drum supports, and said drum supports each having a respective shaft upon which one of the tension line receiving drums is supported.

17. The hoist apparatus of claim 16 in which said crank arm is mounted on a crank arm frame supported for pivotal movement by the drum supporting shafts.

18. A method of transferring the end of a power line between first and second supports at different locations comprising the steps of:
  providing a hoist apparatus having a pair of independently operable hoist mechanisms each including a respective tension line receiving rotatable drum and a tension line coupled to the drum, said drum of each hoist mechanism having a respective ratchet mechanism that includes a pair of pawl mechanisms for enabling selective ratcheted rotational movement of the drum for winding and unwinding the tension line from the drum, a single pivotable crank arm for actuating said ratchet mechanisms, and one pawl mechanism of each pair including a selectively positionable pawl moveable between a first pawl position in which the respective ratchet mechanism rotates the respective drum in a take up direction upon pivotal movement of the single crank arm from a crank arm first position to a second crank arm position for winding the respective tension line on the respective drum and a second pawl position in which the ratchet mechanism enables rotation of the respective drum in a release direction for unwinding the tension line from the respective drum upon pivotable movement of said single crank arm from said first crank arm position to the second crank arm position;
  connecting an outer end of the tension line of one hoist mechanism to the end of the power line to be transferred, and connecting an outer end of the tension line of the other hoist mechanism to a support to which the power line is to be transferred;
  selectively positioning the selectively positionable pawl of each said one pawl mechanism to the first pawl position; and
  pivoting the single crank arm between the first crank arm position and the second crank arm position for causing the ratchet mechanisms of the respective hoist mechanisms to simultaneously rotate the respective drum of each hoist mechanism in a take-up direction for simultaneously drawing the respective tension lines onto the respective drums of the hoist mechanisms.

19. The method of claim 18 including the steps of selectively positioning the selectively positionable pawl of each said one pawl mechanism to the second pawl position, and pivoting the single crank arm between said first crank arm position and said second crank arm position for enabling the ratchet mechanisms of the respective hoist mechanisms to simultaneously rotate the respective drums of the hoist mechanism in a release direction for simultaneously unwinding the respective tension lines from the drum of each hoist mechanism.

20. The method of claim 19 including setting the steps of selectively positioning the selectively positionable pawl of the one pawl mechanism of one hoist mechanism to the first pawl position and selectively positioning the selectively positionable pawl of the one pawl mechanism of the other hoist mechanism to the second pawl position, and pivoting the single crank arm between the first crank arm position and the second crank arm position for causing the ratchet mechanism of the one hoist mechanism to rotate the respective drum of that hoist mechanism in a take-up direction for drawing the respective tension line onto the respective drum and simultaneously enabling rotation of the drum of the other hoist mechanism in the release direction for unwinding the tension line from the drum of that hoist mechanism.

* * * * *